(12) United States Patent
Harada et al.

(10) Patent No.: US 6,662,985 B2
(45) Date of Patent: Dec. 16, 2003

(54) HOLDER FOR PORTABLE TERMINAL

(75) Inventors: Hideki Harada, Osaka (JP); Naoyuki Ito, Osaka (JP); Nobuhiro Ide, Nara (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 100 days.

(21) Appl. No.: 09/840,984

(22) Filed: Apr. 25, 2001

(65) Prior Publication Data

US 2002/0047033 A1 Apr. 25, 2002

(30) Foreign Application Priority Data

Oct. 6, 2000 (JP) ......................................... 2000-307272

(51) Int. Cl.⁷ ................................................. A45C 1/04
(52) U.S. Cl. ..................................... 224/661; 224/904
(58) Field of Search ............................. 224/661, 660, 224/662, 664, 674, 576, 904, 267, 269, 268, 901.8, 907, 218–222, 242, 246, 250, 251, 415, 414

(56) References Cited

U.S. PATENT DOCUMENTS

| | | | | |
|---|---|---|---|---|
| 4,848,624 A | * | 7/1989 | Clem | 224/222 |
| 5,215,238 A | * | 6/1993 | Baruch | 224/243 |
| 5,326,005 A | * | 7/1994 | Fisher | 224/245 |
| 5,445,303 A | * | 8/1995 | Cawile, Jr. | 224/222 |
| 5,465,889 A | * | 11/1995 | Smith | 224/235 |
| 5,570,824 A | * | 11/1996 | Lyon et al. | 224/148.5 |
| 5,624,065 A | * | 4/1997 | Steffe | 224/625 |
| 5,704,531 A | * | 1/1998 | Nam | 224/235 |
| 5,813,162 A | * | 9/1998 | Tse et al. | 224/200 |
| 5,890,809 A | * | 4/1999 | Nelson | 224/148.5 |
| 5,927,581 A | * | 7/1999 | Reddy et al. | 224/578 |
| D413,430 S | * | 9/1999 | Granata | D3/10 |
| 6,065,659 A | * | 5/2000 | Faz | 206/570 |
| 6,182,878 B1 | * | 2/2001 | Racca | 224/605 |
| D447,864 S | * | 9/2001 | Casparian | D3/218 |

* cited by examiner

*Primary Examiner*—Lee Young
*Assistant Examiner*—Lien Ngo
(74) *Attorney, Agent, or Firm*—Wenderoth, Lind & Ponack, L.L.P.

(57) ABSTRACT

A holder allows a portable terminal to be held selectively on a waist or a thigh. The portable terminal holder comprises an accommodating unit for accommodating the portable terminal, and plural wearing units for having the accommodating unit worn on a body. The plural wearing units include a thigh fixing band to be worn on the thigh, a belt fixing band to be suspended on a waist belt, and a waist belt band having only an inserting unit slightly wider than the width of the belt. The units are attached to the accommodating unit.

20 Claims, 3 Drawing Sheets

HOLDER FOR PORTABLE TERMINAL

FIELD OF THE INVENTION

The present invention relates to a holder for holding a portable terminal, such as a portable personal computer, on a body of a user.

BACKGROUND OF THE INVENTION

Portable terminals such as a portable personal computers have recently been getting smaller and lighter. Therefore, in order for a user to carry portable terminal outdoors, the portable terminal may be designed to be worn on the body of the user directly or with a holder.

A conventional holder for a portable terminal will be explained below with reference to FIG. 3 which is an outline view a holder attached to a body. Holding members 23 through which a waist belt 24 of trousers or the like passes are provided on a case 22 of a portable terminal 21. When wearing the portable terminal 21 on the waist of the body, the user passes the waist belt 24 between the case 22 of the portable terminal 21 and the holding members 23.

The position at which this portable terminal holder can be worn is limited to the waist of the body. When working outside, for example, a user often wears working tools on a waist belt, and thus, space for wearing the portable terminal may not be available, or the portable terminal may be damaged by the tools.

SUMMARY OF THE INVENTION

A holder, for holding a portable terminal, is wearable selectively on a waist or a thigh.

The holder comprises an accommodating unit for accommodating the portable terminal, and plural wearing units attached to the accommodating unit for wearing the accommodating unit selectively on the thigh or the waist of a body. As a result, depending on the desired usage, the portable terminal can be flexibly worn on either the thigh or the waist.

DESCRIPTION OF THE PREFERRED EMBODIMENT

An exemplary embodiment of the present invention will be described below while referring to FIG. 1 and FIG. 2.

Figure 1:
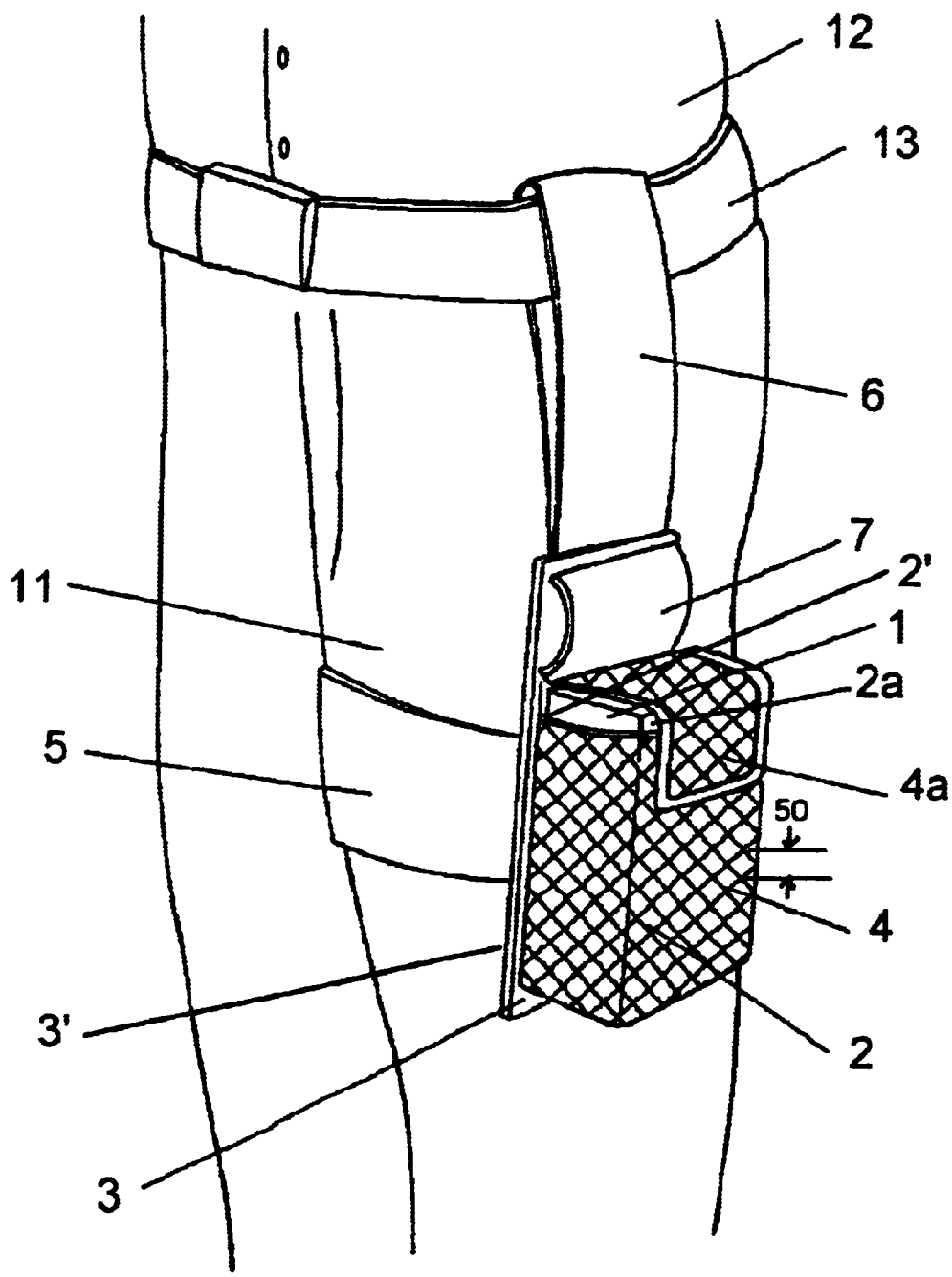
FIG. 1 is an outline view a holder for a portable terminal worn on a thigh according to an exemplary embodiment of the present invention.
Figure 2:
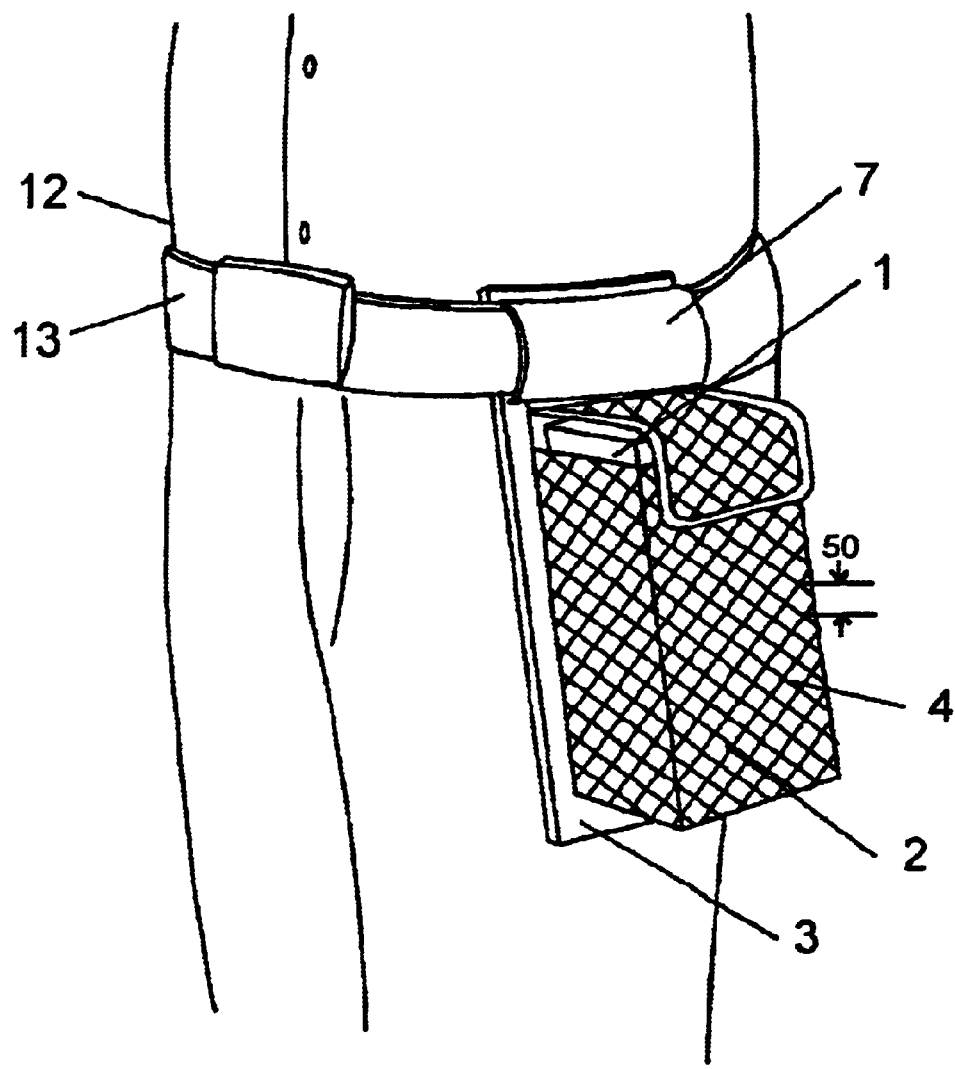
FIG. 2 is an outline view of the portable terminal holder worn on a waist according to the embodiment.
Figure 3:
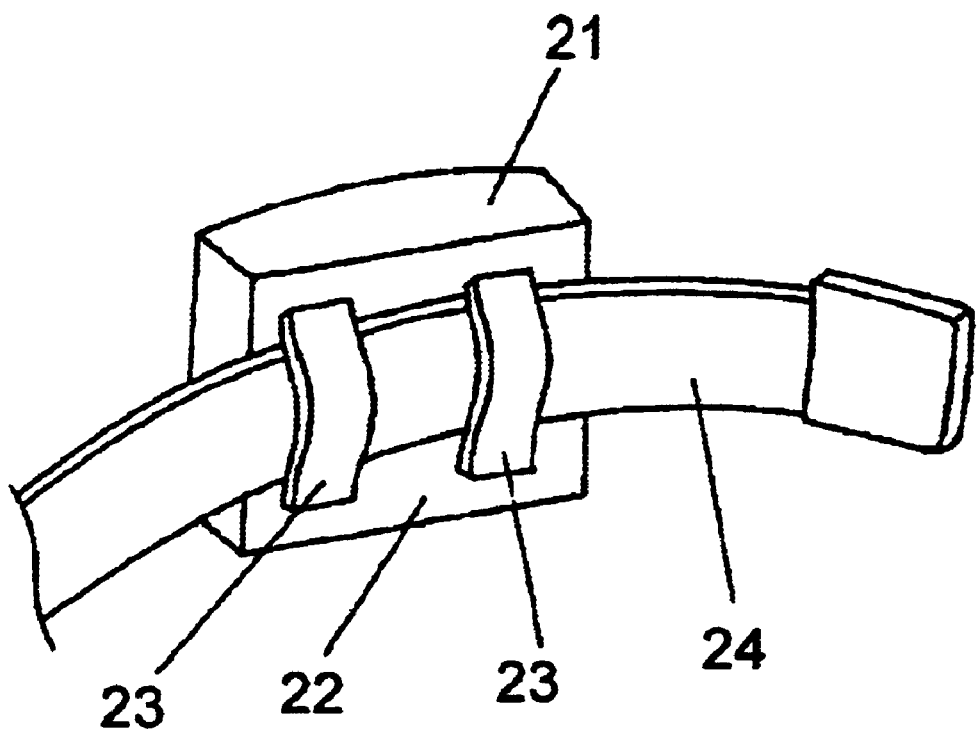
FIG. 3 is an outline view of a conventional holder holding a portable terminal.

FIG. 1 and FIG. 2 are outline views of a holder for a portable terminal according to an exemplary embodiment of the present invention. FIG. 1 particularly shows the holder worn on a user's thigh 11, and FIG. 2 particularly shows the holder worn on a user's waist 12. A portable terminal 1 is accommodated in an accommodating unit 2. The accommodating unit 2 comprises an elongated, generally flat backing member formed as a cushion pad 3 made of highly heat insulating material 3' and an air-permeable mesh case 4 made of highly heat insulating material. At the top of the mesh case 4, an opening 2a is provided through which the portable terminal 1 is inserted into and removed from the accommodating unit 2. A mesh lid 4a is provided to cover the opening 2a. The heat insulating material for the cushion pad 3, mesh case 4, and lid 4a is preferably to be made of flexible material having a high heat insulating performance such as cloth or molded material. The cushion pad 3 includes a thigh fixing band 5 for fixing the cushion pad 3 stably to the thigh 11, a belt fixing band 6 for suspending the holder on a belt 13 provided about the waist 12, and a waist belt band 7 through which the belt 13 passes.

When the user wears the portable terminal 1 on the thigh 11, the cushion pad 3 of the accommodating unit 2 attaches to the thigh 11, and the thigh fixing band 5 is wound and fixed around the thigh 11. In this case, the thigh fixing band 5 allows the portable terminal 1 to descend due to its own weight. The belt fixing band 6 through which the belt 13 passes is suspended on the belt 13, and thereby, holds the portable terminal 1 stably on the thigh 11.

As shown in FIG. 2, when the portable terminal 1 is held in the accommodating unit 2 on the belt 13 of the waist 12, the belt 13 passes through the waist belt band 7 of the accommodating unit 2. As a result, the portable terminal 1 can be stably worn on the waist 12.

Thus, the portable terminal can be selectively worn on either the waist or the thigh. Even when holding working tools on the waist belt, the user can wear the portable terminal on the thigh, and the tools will not damage the portable terminal.

Meanwhile, the cushion pad 3 insulates against the heat generated by the portable terminal 1 to prevent the heat from being transferred to the thigh 11. Moreover, the outer surface of the portable terminal 1 is naturally cooled by the air through the mesh case 4 and lid 4a and thus is prevented from increasing in temperature. The pitch (i.e. interval) 50 and thickness of the mesh are determined so that a hand or skin may not touch the portable terminal 1. Therefore, without the heat transferred to the hand or skin, the portable terminal 1 can be cooled and prevented from increasing in temperature.

A portion of the accommodating unit 2 may be made of heat transfer material 2' that tightly contacts the portable terminal 1, to thus release the heat.

Providing, the thigh fixing band 5 or belt fixing band 6 with an adjustable length allows the portable terminal holder to be worn stably depending on the physique of the user.

The opening 2a, through which the portable terminal 1 is inserted into and removed the accommodating unit 2 allows the portable terminal to be easily inserted and removed even when the accommodating unit 2 is worn on the thigh 11 or waist 12.

According to the present invention, the accommodating unit is worn on the thigh with the thigh fixing band and suspended on the waist belt with the belt fixing band through which the belt passes. The holder thus allows the portable terminal to be flexibly worn on the thigh or waist depending on the desired usage, and has only a few constituent members. In addition, the accommodated portable terminal its the outer surface cooled naturally in the air and thus is prevented from increasing in temperature.

What is claimed is:

1. A portable terminal holder for use in wearing a portable terminal on a body, comprising:
    an accommodating unit including an accommodating case for accommodating the portable terminal, said accommodating unit having a top end and a bottom end;
    a lid provided on said accommodating case, wherein an opening is formed in said accommodating case, and said lid covers said opening;

an elongated belt fixing band having a bottom end secured to said top end of said accommodating unit and a top end arranged to define a first waist belt-receiving opening for receiving therethrough a waist belt secured about a waist of the body, such that said belt fixing band is operable to suspend said accommodating unit downwardly from the waist belt;

a thigh fixing band secured to said accommodating unit and arranged to be engaged about a thigh of the body so as to fix said accommodating unit to the thigh;

a waist belt band fixed at said top end of said accommodating unit and arranged to define a second waist belt-receiving opening for receiving therethrough the waist belt secured about the waist of the body, so as to secure said accommodating unit adjacent the waist, said waist belt band being disposed above said accommodating case;

wherein said top end of said belt fixing band is spaced above said waist belt band such that said accommodating unit is disposed lower on the body when the waist belt secured about the waist is received through said top end of said belt fixing band than when the waist belt secured about the waist is received through said waist belt band; and wherein said first and second waist belt-receiving openings are arranged so that, when said accommodating unit is suspended downwardly from the waist belt by said belt fixing band and is fixed to the thigh by said thigh fixing band, both of said first and second waist belt-receiving openings are oriented generally in the same direction.

2. The holder of claim 1, wherein said accommodating unit has a first side to be worn against the body and a second side opposite said first side, and said accommodating unit comprises a heat insulating material provided at said first side thereof.

3. The holder of claim 1, wherein at least a portion of said accommodating case is made of an air-permeable mesh member.

4. The holder of claim 3, wherein a thickness of said mesh member is determined so as to prevent the body from touching the portable terminal, when received in said accommodating case, from an outside of said accommodating case.

5. The holder of claim 3, wherein a mesh interval of said mesh member is determined so as to prevent the body from touching the portable terminal, when received in said accommodating case, from an outside of said accommodating case.

6. The holder of claim 1, wherein at least a portion of said accommodating unit is made of heat transfer material.

7. The holder of claim 1, wherein said accommodating unit comprises a cushion pad at said first side thereof to be interposed between the portable terminal and the body.

8. A portable terminal holder for use in wearing a portable terminal on a body, comprising:

an elongated, generally flat backing member having a top end and a bottom end;

an accommodating case for accommodating the portable terminal, said accommodating case having a top end and a bottom end and being supported by said backing member;

an elongated belt fixing band having a bottom end secured to said top end of said backing member and a top end for receiving therethrough a waist belt secured about a waist of the body, such that said belt fixing band is operable to suspend said accommodating case downwardly from the waist belt;

a thigh fixing band secured to said backing member and arranged to be engaged about a thigh of the body so as to fix said accommodating case to the thigh;

a waist belt band fixed at said top end of said backing member, separate from said accommodating case, such that a waist belt opening is defined between said backing member and said waist belt band, for receiving therethrough the waist belt secured about the waist of the body, so as to secure said accommodating case adjacent the waist, said waist belt opening not being bordered by said accommodating case, and said waist belt band being disposed above said accommodating case;

wherein said top end of said belt fixing band is spaced above said waist belt band such that said accommodating case is disposed lower on the body when the waist belt secured about the waist is received through said top end of said belt fixing band than when the waist belt secured about the waist is received through said waist belt band.

9. The holder of claim 8, wherein at least a portion of said accommodating case is made of an air-permeable mesh member.

10. The holder of claim 9, wherein a thickness of said mesh member is determined so as to prevent the body from touching the portable terminal, when received in said accommodating case, from an outside of said accommodating case.

11. The holder of claim 9, wherein a mesh interval of said mesh member is determined so as to prevent the body from touching the portable terminal, when received in said accommodating case, from an outside of said accommodating case.

12. The holder of claim 8, wherein at least a portion of said accommodating case is made of heat transfer material.

13. The holder of claim 8, further comprising a lid provided on said accommodating case, wherein an opening is formed in said accommodating case, and said lid covers said opening.

14. The holder of claim 8, wherein said backing member comprises a cushion pad provided at said first side of said accommodating case to be interposed between the portable terminal and the body.

15. A portable terminal holder for use in wearing a portable terminal on a body, comprising:

an accommodating unit including an accommodating case for accommodating the portable terminal, said accommodating unit having a top end and a bottom end;

an elongated belt fixing band having a bottom end secured to said top end of said accommodating unit and a top end for receiving therethrough a waist belt secured about a waist of the body, such that said belt fixing band is operable to suspend said accommodating unit downwardly from the waist belt;

a thigh fixing band secured to said accommodating unit and arranged to be engaged about a thigh of the body so as to fix said accommodating unit to the thigh;

a waist belt band fixed at said top end of said accommodating unit for receiving therethrough the waist belt secured about the waist of the body, so as to secure said accommodating unit adjacent the waist, said waist belt band being disposed above said accommodating case;

wherein said top end of said belt fixing band is spaced above said waist belt band such that said accommodating unit is disposed lower on the body when the waist belt secured about the waist is received through said top end of said belt fixing band than when the waist belt secured about the waist is received through said waist belt band;

wherein said accommodating unit has a first side to be worn against the body and a second side opposite said first side, and said accommodating unit comprises a heat insulating material provided at said first side thereof; and wherein at least a portion of said accommodating unit is made of heat transfer material for contacting the portable terminal to release heat therefrom.

16. The holder of claim 15, wherein at least a portion of said accommodating case is made of an air-permeable mesh member.

17. The holder of claim 16, wherein a thickness of said mesh member is determined so as to prevent the body from touching the portable terminal, when received in said accommodating case, from an outside of said accommodating case.

18. The holder of claim 16, wherein a mesh interval of said mesh member is determined so as to prevent the body from touching the portable terminal, when received in said accommodating case, from an outside of said accommodating case.

19. The holder of claim 15, further comprising a lid provided on said accommodating case, wherein an opening is formed in said accommodating case, and said lid covers said opening.

20. The holder of claim 15, wherein said accommodating unit comprises a cushion pad at said first side thereof, and said cushion pad is made of said heat insulating material.

* * * * *